Dec. 29, 1936.   F. REESE   2,066,188
WEATHER STRIP
Filed Aug. 17, 1935   2 Sheets-Sheet 2
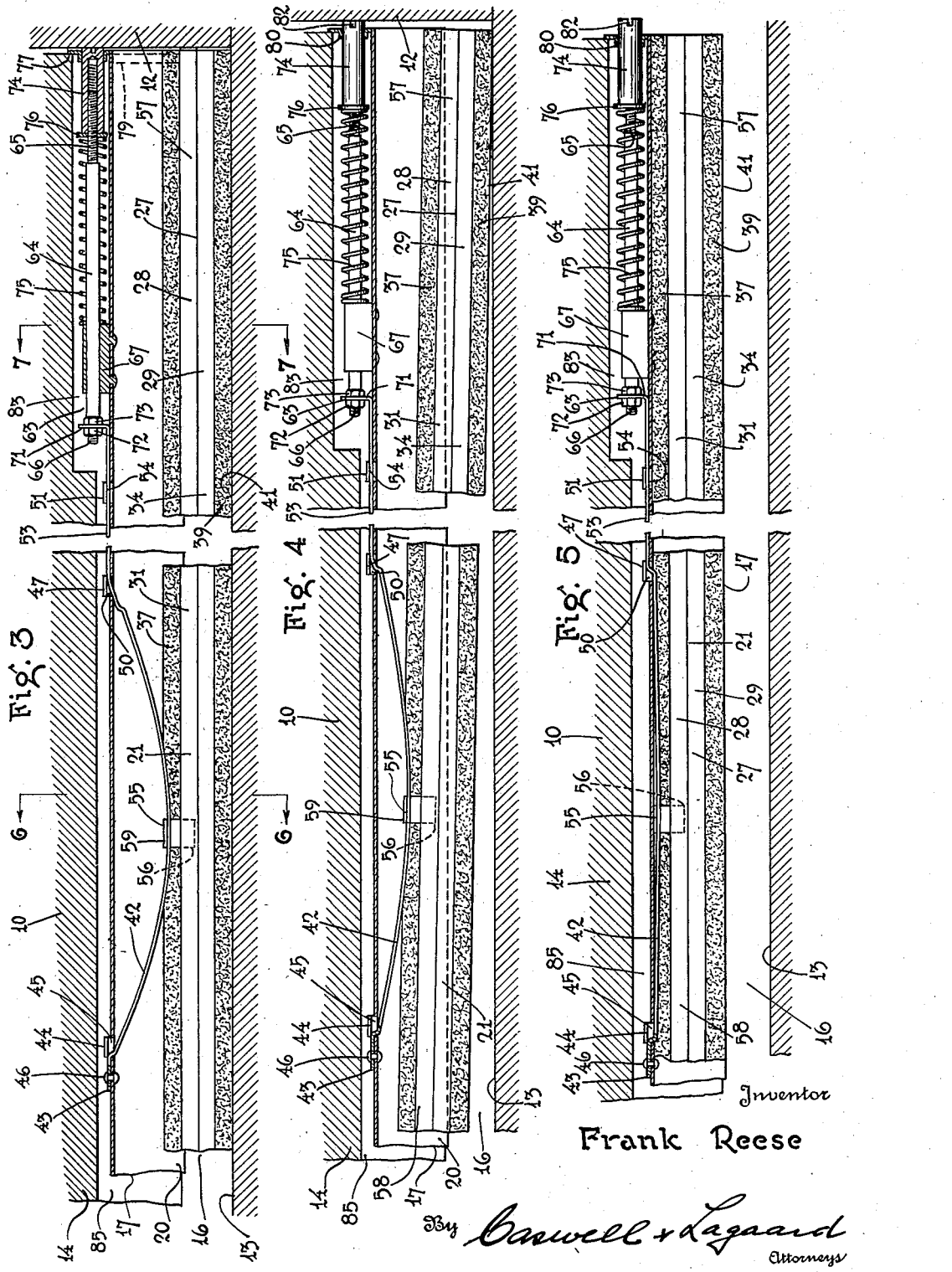
Inventor
Frank Reese
By Caswell & Lagaard
Attorneys Patented Dec. 29, 1936

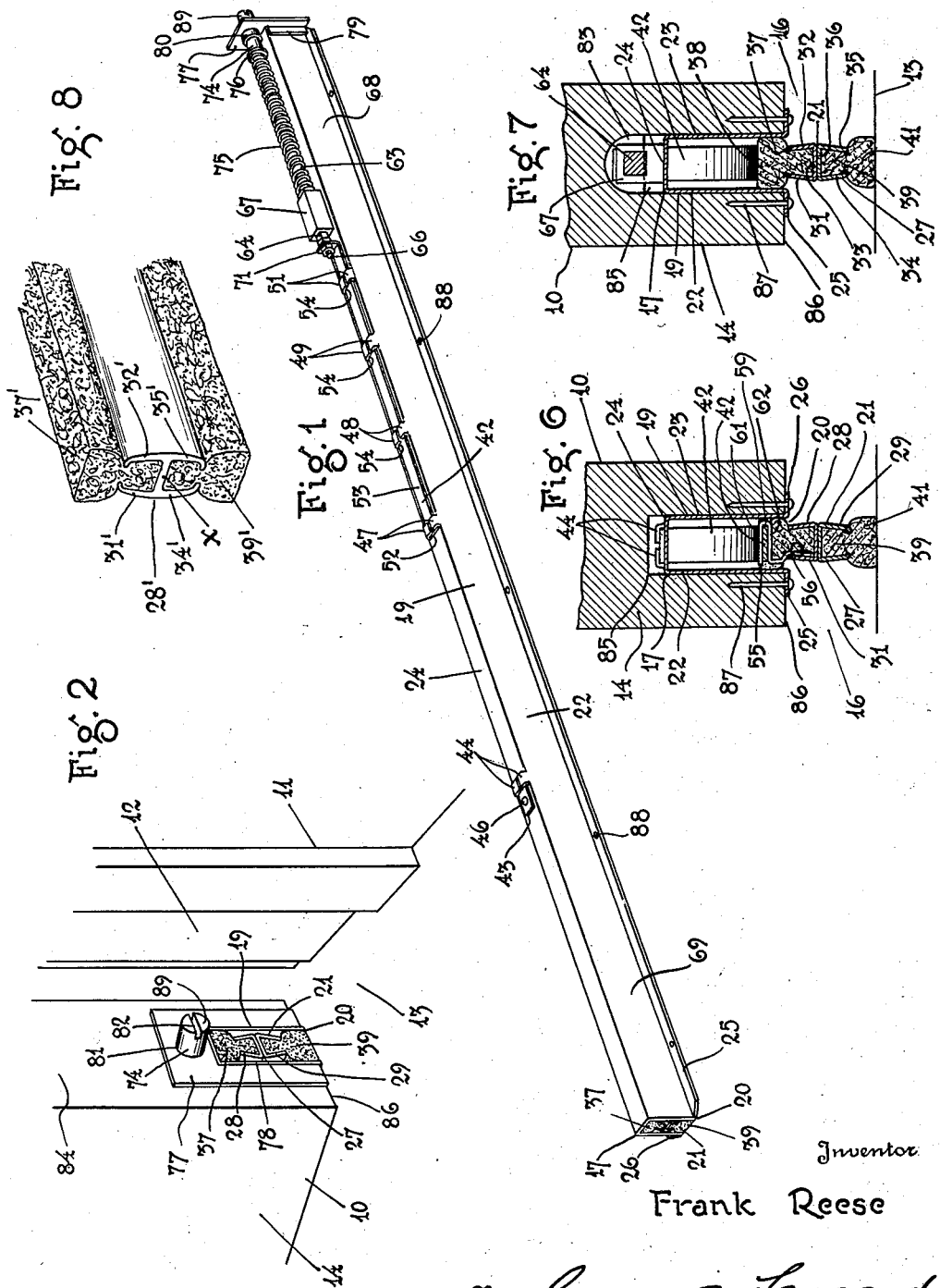

2,066,188

UNITED STATES PATENT OFFICE 2,066,188

WEATHER STRIP

Frank Reese, Minneapolis, Minn., assignor to Reese Metal Weather Strip Co., Minneapolis, Minn., a corporation of Minnesota Application August 17, 1935, Serial No. 36,713

7 Claims. (Cl. 20—68)

My invention relates to weather strips and particularly to the type of weather strip applicable to the lower marginal portion of a door for obstructing the space between the door and the surface of the floor or threshold over which the door closes.

An object of my invention is to improve the type of weather strip employing a retractable member carried by a leaf or similar spring of sufficient inherent resiliency to lift said member after being bowed by the transmission thereto of endwise pressure for depressing said member.

Another object of the invention resides in providing a weather strip having a housing and a retractable member movable therefrom into engagement with the floor or retractable into the housing and in providing said retractable member with sealing means adapted to engage both the floor and housing when in operation to prevent leakage of air past the same.

A still further object of the invention resides in providing a weather strip in which the sealing means comprises two separate sealing strips, one for engagement with the floor and the other for engagement with the housing.

A feature of the invention resides in utilizing a frame, H-shaped in cross-section, for carrying said sealing strips.

Another object of the invention resides in providing a resilient suspension tape for the retractable member which is relatively limp to facilitate the bowing thereof by pressure exerted endwise against the same, but which, at the same time, is sufficiently stiff to insure the depression of said member into position snugly contacting the floor, a further object being to provide separate means for tensioning the tape to lift the retractable member into sheathed position within the housing.

A still further object of the invention resides in using a compression coil spring for the purpose of tensioning the tape.

Another object of the invention resides in providing a plunger connected to the end of the tape and in providing a guide on said housing for guiding the plunger for sliding movement in the direction of the length of the tape.

A still further object of the invention resides in providing a head threaded upon the end of the plunger and in arranging said spring to encircle said plunger with the ends thereof seated against said head and guide.

Another object of the invention resides in attaching the tape to the retractable member in such a manner as to cause the end of said member farthest from the hinge of the door to drop to the floor last, as the door is closed, and to rise first, when the door is opened.

A feature of the invention resides in the construction used in the formation of the guides for the sliding end of the tape.

Other objects of the invention reside in the novel combination and arrangement of parts and in the details of construction hereinafter illustrated and/or described.

In the drawings:

Fig. 1 is a perspective view of a weather strip illustrating an embodiment of my invention.

Fig. 2 is a perspective view of a portion of a door and door frame showing the application of my invention thereto.

Fig. 3 is a longitudinal elevational sectional view taken through the lowermost marginal portion of the door and through the weather strip and illustrating the retractable member in operative extended position.

Fig. 4 is a view similar to Fig. 3 showing the retractable member partly raised.

Fig. 5 is a view similar to Fig. 4 showing the retractable member completely raised and retracted within the housing.

Fig. 6 is a cross sectional view taken on line 6—6 of Fig. 3.

Fig. 7 is a cross sectional view similar to Fig. 6 taken on line 7—7 of Fig. 3.

Fig. 8 is a fragmentary perspective view illustrating an alternate form of frame construction for the sealing strips.

In the drawings, an ordinary door, fragmentarily illustrated, is indicated by the reference numeral 10. The hinged edge of said door is designated by the numeral 84 and the lower edge at the lowermost portion 14 of the door is designated by the numeral 86. This door is mounted to swing in a door frame 11 which is constructed with a vertical frame member 12 to which said door 10 is hinged by the usual hinges. The door swings over the floor 13, the lower edge thereof being clear of the floor, leaving a space 16 between door and floor. The type of weather strip dealt with herein is for the purpose of obstructing such space between door and floor when the door is shut.

My invention proper consists of a weather strip indicated in its entirety by the reference numeral 17. This structure fits into a groove 85 formed in the lower marginal portion 14 of the door and includes a housing 19 and a retractable sealing member or drop 21 adapted to be sheathed within said housing in a retracted position and to be projected from said housing to engage the surface of the floor 13 and close the space 16 between door and floor.

The housing 19 is constructed from sheet metal and is U-shaped in cross section. It is formed with two spaced parallel side walls 22 and 23 and a wall or web 24 connecting the upper edges of the walls 22 and 23. Thus constructed, the housing 19 has an opening, as at 20, along the bottom thereof, the retractable member 21 being movable into or out of the housing through said opening to serve its purpose. Turned outwardly from the lowermost edges of the walls 22 and 23 are flanges 25 and 26. These flanges have holes 88 formed therein through which nails may be driven into the lower edge of the door to secure the weather strip in place. The end of housing 19 nearest the hinged edge of the door is indicated by the reference numeral 68, while the other end is indicated by the reference numeral 69.

The retractable member or drop 21 is constructed with an H-shaped frame 27 formed of two channel shaped frame members 28 and 29 arranged back to back and secured together by welding, rivets or otherwise. The channel shaped frame member 28 includes flanges 31 and 32 and a web 33, the frame member 29 being similarly constructed with flanges 34 and 35 and a web 36. The webs 33 and 36 are disposed back to back, the one being attached to the other, as described. Within the channel frame member 28 is disposed a sealing strip 37 constructed of felt or other similar suitable sealing material which is snugly received between the two flanges 31 and 32 and which is clamped in place between said flanges. To assist in holding said sealing strip in position the flanges 31 and 32 preferably converge, as illustrated. The sealing strip 37 is constructed of material such that the exposed portion 38 thereof brooms outwardly sufficiently so that when the retractable member is disposed within the housing 19, portion 38 engages the inner surfaces of the two walls 22 and 23 and forms a seal between the said walls and the retractable member. A similar sealing strip 39 is mounted in the channel frame member 29, said sealing member being disposed between the two flanges 34 and 35 of said frame member which converge, as indicated, to hold the said sealing strip securely attached to the frame 27. The sealing strip 39 is constructed with a projecting portion 41 which engages the surface of the floor 13 when the retractable sealing member is in extended position, as shown in Figs. 3, 6 and 7. The end of the retractable member 21 nearest the hinged edge of the door is designated by the reference numeral 57 and its other end by the reference numeral 58.

Instead of forming the H-shaped frame 27 of the sealing member 21 by bringing two channels together back to back, I contemplate forming a one-piece frame by the extrusion of metal suitable for the purpose, such a frame being illustrated in Fig. 8 of the drawings as an alternate construction. In said Fig. 8, an upper sealing strip 37' is shown as being clamped between flanges 31', 32' and a sealing strip 39' as being clamped between flanges 34', 35', which flanges together with the bar $x$ comprise a one-piece frame 28'.

The retractable member 21 is suspended by means of a flexible tape 42 which operates to lift and depress said member and thereby draw it up into the housing and project it from said housing. This tape, preferably of thin resilient metal, is comparatively limp in order that it may be easily bowed upon the application of pressure thereto endwise thereof, but has sufficient stiffness so that, upon being bowed, it will insure the depression of said member 21 and cause it snugly to engage the floor. Said tape 42 is attached at one end 43 to the upper surface of the wall 24 of the housing 19, two tongues 44 being struck out of the material of the said wall to form an opening 45 through which the tape is passed from the inside to the outside of the housing. Said end 43 of said tape is secured by means of a rivet 46 to a portion of the wall 24 adjoining said opening 45. This tape freely clears the walls 22 and 23 at its edges and the tongues 44 hold said tape down against the housing wall 24 between the rivet 46 and the opening 45 in said wall. Other sets of tongues 47, 48, 49 and 51, similar to the tongues 44, are struck from the housing wall 24. The formation of the tongues 47 provides an opening 50, similar to the opening 45 in said wall 24. The portion 53 of tape 42 extends through said opening 50 and along the top of the housing wall 24 through spaces 54 between the tongues 48, 49 and 51 and the upper plane of said wall. Slidable freely along the wall 24, the portion 53 of the tape 42 is guided by said tongues 48, 49 and 51 for movement in the direction of the length of the tape. The openings 45 and 50 in the housing wall 24 are located at opposite sides of the middle of the housing 19 so that the tape 42, when bowed within the housing, will bow approximately medially of said housing.

The retractable member or drop 21 is attached to the tape 42 in the following manner: A clip 55 constructed from a strip of sheet metal is bent into the form illustrated in Fig. 6, the same having a leg 56 which is disposed upon the interior of the channel member 28 of frame 27 and welded to the flange 31 of said member. The head 59 of the clip 55 is U-shaped and comprises two spaced arms 61 and 62 between which the tape 42 is received. This head portion of said clip is readily hooked over the tape or unhooked therefrom when said tape is bowed sufficiently to extend beyond the bottom of the housing 19. With said head hooked upon the tape, it is so held, by reason of the engagement of the portion 38 of sealing strip 37 with the wall 23 of housing 19, as long as said tape is not abnormally bowed and thereby extended at its bowed portion beyond the lower edge of said housing. The clip 55 is secured to the member 27 at a point at one side of the middle thereof, such point being farthest from the hinged edge of the door so that the end 57 of said member at said edge of said door will first drop to the floor when the tape is bowed, and will be lifted last when said tape is drawn taut.

For the purpose of operating the retractable member 21, an operating device is employed which is indicated in its entirety by the reference numeral 63. This operating device comprises a plunger 64 preferably rectangular in cross section which, at its ends, has reduced threaded shanks 65 and 66. The plunger 64 is guided for movement in a guide 67 secured to the wall 24 of housing 19 at the end 68 of said housing nearest the hinged edge 84 of the door. The extremity 71 of the portion 53 of tape 42 is bent outwardly and formed with an opening to receive the shank 66 of plunger 64. Binding nuts 72 and 73 screwed upon the shank 66 secure the tape 42 to the plunger 64.

Threaded upon the shank 65 of the plunger 64 is a cylindrical head 74 which extends outwardly from the said plunger and beyond the end of the housing 19, where it may engage the frame member 12 of door frame 11 and operate the device, as will be presently described in detail.

A compression coil spring 75 encircles the plunger 64 and is seated at one end against the guide 67 and at its other end against a washer 76 encircling the shank 65 and backed by the head 74. This compression coil spring 75 urges the plunger 64 toward the right, as viewed in Fig. 3. This has the effect of tensioning the tape 42, and thereby drawing the retractable member 21 upwardly into housing 19. It can readily be comprehended that where the inherent resiliency of an arched leaf spring is depended upon to lift the retractable member, such spring, even though comparatively powerful, would have practically no force to elevate and sustain said member with the bow in the spring substantially diminished. By the use of the coil spring 75, considerable force can be exerted at all times through the relatively limp tape 42, so that the retractable member is firmly held in retracted position. And, too, it will readily be comprehended that the bowing of the relatively limp tape 42 can be initiated, when the tape is substantially straight, and continued, with a minimum force applied to the end of said tape.

For the purpose of supporting the plunger 64 at the end thereof carrying the head 74 and for closing the end of the groove in the door in which the device is mounted, an end plate 77 is employed, the same being attached to the housing 19. This end plate is notched, as at 78, to receive the end of the housing, and attaching flanges 79, turned inwardly from the plate 77, are riveted or spot welded to the walls 22 and 23 of said housing. This end plate 77 extends above the housing 19 and is formed at its upper portion with a boss 80, said boss being provided with an opening 81 in which the head 74 is guided for reciprocating movement. Head 74 is constructed with a screw driver slot 82 by means of which it is turned on the threaded shank 65 for purposes of adjustment.

In preparing a door for the installation of my improved device, a hole 83 is first bored into the door from the edge 84, such that the hole will accommodate the plunger 64, the plunger guide 67 and the various parts attached to the plunger. After the hole 83 is bored, the lower edge 86 of the door is formed with a groove 85 of a width sufficient snugly to receive the housing 19 and of a depth slightly greater than the depth of the housing proper. This groove 85 intersects the hole 83 and the material of the door where the hole and groove intersect is cut away, the cross sectional shape of the recess formed thereby being shown in Fig. 7. The weather strip in its assembled form is next inserted into the groove 85, the flanges 25 and 26 taking position against the lower edge 86 of the door, with the plate 77 against the edge 84 of said door. Nails 87 are next driven through the holes 88 in the flanges 25 and 26 and into the door to hold the structure in position.

When the door 10 is shut, the outer extremity 89 of the plunger head 74 abuts against the frame member 12 of the door frame 11, as shown in Fig. 3. With the head 74 properly adjusted upon the shank 65 of plunger 64, the tape 42 will be bowed so as to hold the retractable member 21 in depressed position snugly engaged with the surface of the floor. The space 16 between the door and floor is thus effectively obstructed, the strip 39 providing a seal between the member 21 and the floor and the strip 37 providing a seal between said member 21 and the housing 19. Upon opening the door, the spring 75 begins immediately to draw the tape taut and thus initiates the elevation of the retractable member 21. At first, the elevation of said member occurs at the outer end 58 thereof (Fig. 4), this being due to the location of the clip 55 on the member 21. Then, after said end 58 at the free edge of the door clears the floor, the inner end 57 of said member 21 is lifted. When the door is opened far enough so that the head 74 is fully extended and clear of the door frame member 12, the spring 75 will have pulled the tape 42 taut, thereby sheathing the retractable member 21 within the housing, as shown in Fig. 5. During the continued opening movement of the door and during the return closing movement thereof up to the final stage, the member 21 remains sheathed within the housing 19 where it is entirely clear of the floor, rugs or carpet over which the door swings. During the said final stage in the closing movement of the door, the head 74 engages the member 12 of the door frame 11 and causes the plunger 64 to be shifted inwardly against the action of the spring 75. This movement of the plunger slackens and bows the tape 42 within the housing 19, causing the member 21 to be projected from the housing, the inner end 57 thereof first. The tape 42, due to its relatively limp character, is readily bowed so that the force necessarily exerted against the plunger 64 need be but little more than enough to compress the coiled spring 75.

The application of my improved weather strip to any ordinary door is very easily accomplished and, once installed, the device will function indefinitely without attention. It operates smoothly and reliably at all times, the tape being easily bowed to depress the retractable member 21 and readily tightened by the coiled spring 75 to elevate and sheath said member 21 with positiveness of action. By means of the two sealing strips, all leakage of air is eliminated.

Changes in the specific form of my invention, as herein disclosed, may be made within the scope of what is claimed without departing from the spirit of my invention, Having described my invention, what I claim as new and desire to protect by Letters Patent is:

1. The combination with a door frame and a door hinged at one side thereof to said frame and having a groove in its lower edge enlarged in depth at the hinged edge of said door, of a weather strip within said groove for closing the space between the floor and the closed door, said weather strip comprising a housing having side walls and an upper connecting wall formed with an opening therein, a sealing drop within the housing movable into projected and retracted positions relative thereto, a resilient suspension tape extending through said opening in said upper housing wall and contained partly within and partly without the housing, that portion of the tape within the housing being connected at its end to said housing and at another point to said drop, a plunger mounted on the connecting wall of the housing at the outside thereof and disposed within said enlargement of said groove in said door, said plunger being connected with said tape and substantially aligned therewith and adapted to cooperate with the door frame, upon the closing of the door, to bow the tape within the housing and lower said drop, said tape being adapted to be readily bowed, it being relatively limp and insufficiently resilient alone to elevate said drop, but sufficiently resilient to press the drop snugly against the floor, upon the bowing of the tape, and a spring encircling the plunger and cooperating therewith to draw the tape taut and lift said drop, upon the opening of the door.

2. The combination with a door frame and a door hinged at one side thereof to said frame, of a weather strip at the lower margin of the door for closing the space between the floor and the closed door, said weather strip comprising a housing having side walls and an upper connecting wall formed with an opening therein, a sealing drop within the housing movable into projected and retracted positions relative thereto, a resilient suspension tape extending through said opening in said upper housing wall and contained partly within and partly without said housing, that portion of the tape within the housing being connected at its end to said housing and at another point to said drop, a plunger mounted on the connecting wall of the housing at the outside thereof, the plunger being substantially aligned with said tape and connected with the portion thereof outside of the housing, said plunger being adapted to cooperate with the door frame, upon the closing of the door, to bow that portion of the tape within the housing and lower said drop, said tape being relatively limp and readily bowed, yet sufficiently stiff, when bowed, to press the drop snugly against the floor, and a spring acting upon the plunger and causing it to draw the tape taut and lift said drop, upon the opening of the door.

3. The combination with a door frame and a door hinged at one side thereof to said frame, of a weather strip at the lower marginal portion of said door for closing the space between the floor and the closed door, said weather strip comprising a drop, a guide therefor, said drop being movable into projected and retracted positions relative to said guide, a resilient suspension tape extending along said drop, one end of said tape being fixed and the other end being free to move relative to the door, said tape being connected between its ends to said drop, means cooperating with the free end of the tape and with the door frame to shift said free end of said tape in the direction of its length to bow the tape and lower said drop, said tape being adapted to be readily bowed, it being relatively limp and insufficiently resilient alone to elevate said drop, but sufficiently resilient to press the drop snugly against the floor when the tape is bowed, and means acting through said tape to draw the tape taut and lift said drop, upon the opening of the door.

4. The combination with a door frame and a door hinged at one side thereof to said frame, of a weather strip at the lower marginal portion of said door for closing the space between the floor and the closed door, said weather strip comprising a drop, a channel-like guide therefor having side walls, said drop being movable into projected and retracted positions relative to said guide and comprising upper and lower resilient sealing strips and an intermediate bar-like frame common to said strips, a member within the guide and above said drop for projecting and retracting the latter, a hanger depending from said member and secured to said frame, said upper strip being in brushing engagement with the side walls of the guide, such engagement being entirely unbroken in respect to one of said walls, the lower sealing strip, in the projected position of said drop, being adapted yieldingly to engage the floor.

5. The combination with a door frame and a door hinged at one side thereof to said frame, of a weather strip at the lower marginal portion of said door for closing the space between the floor and the closed door, said weather strip comprising a drop, a guide therefor having side walls, said drop being movable into projected and retracted positions relative to said guide, said drop comprising upper and lower resilient sealing strips and an intermediate bar-like frame common to said strips, said upper sealing strip being compressed between said side walls of said guide and in yielding brushing engagement therewith, means for projecting the drop and thereby bringing the lower sealing strip thereof into yielding engagement with the floor, and means for retracting said drop.

6. The combination with a door frame and a door hinged at one side thereof to said frame, of a weather strip at the lower marginal portion of said door for closing the space between the floor and the closed door, said weather strip comprising a drop, a guide therefor having side walls, said drop being movable into projected and retracted positions relative to said guide and comprising a bar, a resilient sealing strip carried by said bar at the lower edge thereof and a similar strip carried by said bar at the upper edge thereof, said latter strip maintaining contact at the sides thereof with the side walls of the guide when the drop is projected, means for projecting the drop and thereby bringing the lower sealing strip thereof into yielding engagement with the floor, and means for retracting said drop.

7. The combination with a frame and a closure therefor movable relative thereto, of a weather strip carried by the closure at a marginal portion thereof for obstructing the space between such portion of said closure and the corresponding portion of said frame, in the closed position of said closure, said weather strip comprising an elongated sealing member, a guide therefor having an elongated side wall, said sealing member being movable transversely of said wall into projected and retracted positions relative to said guide, said sealing member comprising a bar, and a resilient sealing strip carried by said bar at its outer edge for engagement with said frame, a similar strip carried by said bar at the inner edge thereof, said latter strip maintaining contact with said side wall of said guide when the sealing member is projected, means for projecting the sealing member and thereby bringing the outer sealing strip thereof into engagement with the frame, and means for retracting said sealing member.

FRANK REESE.